UNITED STATES PATENT OFFICE.

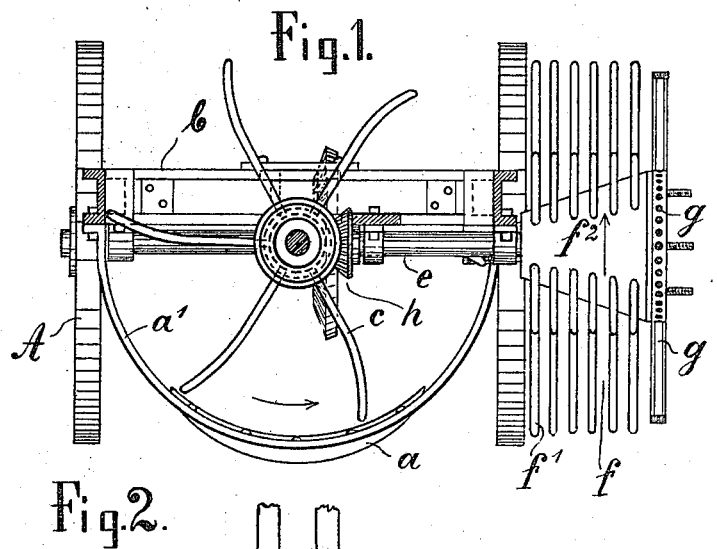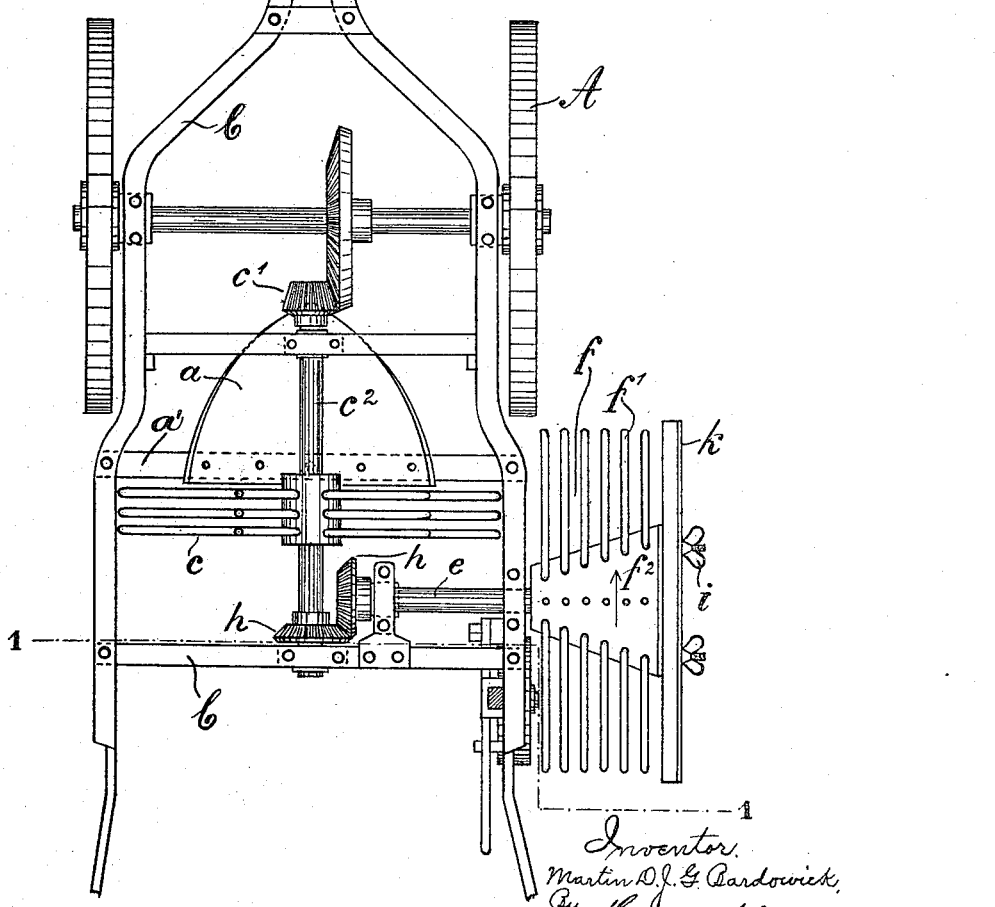

MARTIN DIEDRICH JAKOB GOTTLIEB BARDOWICK, OF DEINSTE, NEAR STADE, GERMANY.

POTATO-HARVESTING MACHINE.

1,205,143.  Specification of Letters Patent.  Patented Nov. 21, 1916.

Application filed September 30, 1916. Serial No. 123,010.

*To all whom it may concern:*

Be it known that I, MARTIN DIEDRICH JAKOB GOTTLIEB BARDOWICK, subject of the German Emperor, and residing at Deinste, near Stade, in the German Empire, have invented certain new and useful Improvements in Potato-Harvesting Machines, of which the following is a specification.

The present invention refers to a potato harvesting machine of that kind, in which there is a rotatable digger operating in the rear part of the machine.

The object of the invention is not only to provide for a better separating and delivering of the potatoes than was possible with the machines used heretofore, but also to construct a machine of greater simplicity and reduction of weight, so as to facilitate the manipulation of the machine and to reduce the power required for operation. This object is arrived at by a special construction and arrangement of the delivering wheel laterally to the digger, operating parallel to the direction of the track. Potato harvesting machines with rotatable diggers are known, it is true, in which there is also a lateral delivering wheel. These however are not fit for a suitable separating and delivering of the potatoes on account of the inadequate construction and position of the digger.

According to the present invention the delivery wheel has somewhat the shape of a drum or cylinder and is provided with rows of arms or prongs distributed about the axis, and the axis is so arranged, that the arms or prongs move in a vertical plane at right angles to the plane of rotation of the digger, that is to say parallel to the direction of the track.

The potatoes raised by the digger are thrown between the rows of arms or prongs of the delivery wheel and by the latter are cast off behind and delivered in a row or longitudinal heap. Since the arms or prongs of the delivery wheel run in a vertical plane at right angles to the plane of rotation of the digger the potatoes thrown up by the digger fall into the range of the delivery wheel, without it being necessary to use a screen merging into the delivery wheel, and since the earth falls freely down underneath the wheels while the potatoes are thrown off toward the back, a screen underneath the delivery wheel is not necessary.

In the drawing the invention is illustrated on a machine by way of example, showing the most important parts of a potato harvesting machine.

Figure 1 is a sectional rear view of the machine taken on the line 1—1 of Fig. 2. Fig. 2 is a plan of the machine.

A plow or shovel $a$ is fixed to the frame $b$ by means of a curved yoke $a^1$ and behind the shovel there is a rotatable digger $c$, which in a known manner is driven by a gearing $c^1$ from the road wheels A, rotating in a vertical plane at right angles to the track in which the machine is running. Behind the digger $c$ there is a horizontal shaft $e$ suitably journaled in the machine frame $b$ in such manner, that this shaft rotates at right angles to the main shaft $c^2$ and is driven by the latter by means of the conical gearings $h$. On the shaft $e$ the delivery wheel $f$ is mounted provided with a number of equally distributed rows of arms or prongs $f^1$ thus being formed similar to a drum. The arms $f^1$ are attached to a boss $f^2$ in the shape of a cone, the base of which is turned outwardly. At the outer end of the boss radially distributed bars are attached forming the spokes of a circular dash screen $g$, to which may be attached by means of thumb screws $i$ a disk or plate $k$.

The arms or prongs of the delivery wheel $f$ rotate in a vertical plane at right angles to the plane of rotation of the digger.

The potatoes flung upward and sideward by the digger $c$ fall in between the rows of prongs of the delivery wheel $f$, which throw the potatoes backward, falling down laterally to the vehicle in a row or longitudinal heap, while the earth falls.

The dash screen $g$ prevents a throwing out of the potatoes beyond the delivery wheel, but if desired the dash plate $k$ may be attached to the screen $g$, when it is desired to gather up the potatoes at once, but it is preferred to leave them lying in a row or heap. In such case it is not desired that potatoes lie about having by accident been thrown beyond or through the dash screen $g$.

By the aid of the new machine the potatoes are well separated from the earth, although the latter may be damp and heavy, owing to the double throwing up by the digger *c* and the delivery wheel *f*.

I claim:

1. In a potato harvesting machine, a rotatable digger arranged to rotate in a plane at right angles to the forward movement of the machine, and a delivery wheel journaled laterally to the digger and provided with rows of arms, and being so journaled that the arms move in a vertical plane at right angles to the plane of rotation of the digger.

2. In a potato harvesting machine, a rotatable digger arranged to rotate in a plane at right angles to the forward movement of the machine, and a delivery wheel journaled laterally to the digger and provided with rows of arms, and being so journaled that the arms move in a vertical plane at right angles to the plane of rotation of the digger, the rows of arms of the delivery wheel being of such length that the delivery wheel has the shape of a drum.

3. In a potato harvesting machine, a rotatable digger arranged to rotate in a plane at right angles to the forward movement of the machine, and a delivery wheel journaled laterally to the digger and provided with rows of arms, and being so journaled that the arms move in a vertical plane at right angles to the plane of rotation of the digger and a dash device attached to the delivery wheel.

4. In a potato harvesting machine, a rotatable digger arranged to rotate in a plane at right angles to the forward movement of the machine, and a delivery wheel journaled laterally to the digger and provided with rows of arms, and being so journaled that the arms move in a vertical plane at right angles to the plane of rotation of the digger and a dash screen attached to the delivery wheel.

5. In a potato harvesting machine, a rotatable digger arranged to rotate in a plane at right angles to the forward movement of the machine, and a delivery wheel journaled laterally to the digger and provided with rows of arms, and being so journaled that the arms move in a vertical plane at right angles to the plane of rotation of the digger, a dash screen and a dash plate attached to the delivery wheel.

MARTIN DIEDRICH JAKOB
GOTTLIEB BARDOWICK.

Witnesses:
F. A. MAX KAEMPFF,
FRANCIS R. STEWART.

Copies of this patent may be obtained for five cents each, by addressing the "Commissioner of Patents, Washington, D. C."